(12) United States Patent
Kanzaka et al.

(10) Patent No.: US 7,401,760 B2
(45) Date of Patent: Jul. 22, 2008

(54) VACUUM REGULATING VALVE

(75) Inventors: Ikuo Kanzaka, Tsukubamirai (JP);
Toyonobu Sakurai, Tsukubamirai (JP)

(73) Assignee: SMC Corporation, Chiyoda-ku, Tokyo (JP)

( * ) Notice: Subject to any disclaimer, the term of this patent is extended or adjusted under 35 U.S.C. 154(b) by 38 days.

(21) Appl. No.: 11/434,300

(22) Filed: May 15, 2006

(65) Prior Publication Data

US 2006/0266962 A1    Nov. 30, 2006

(30) Foreign Application Priority Data

May 27, 2005   (JP) .............................. 2005-156121

(51) Int. Cl.
*F16K 31/00*    (2006.01)
(52) U.S. Cl. .......................... 251/63.6; 251/63; 251/77
(58) Field of Classification Search .................. 251/62, 251/63, 63.5, 63.6, 84, 77
See application file for complete search history.

(56) References Cited

U.S. PATENT DOCUMENTS 4,526,341 A * 7/1985 Thomas ..................... 251/63.5
5,848,608 A * 12/1998 Ishigaki .................. 137/599.16
6,478,043 B2 * 11/2002 Ishigaki ...................... 137/341
6,708,721 B2 * 3/2004 Fukuda et al. .............. 137/341
6,814,338 B2 * 11/2004 Kajitani ..................... 251/63.6
6,854,705 B2 * 2/2005 Wieder ....................... 251/63.6
6,991,218 B2 * 1/2006 Lovell et al. ................ 251/357

FOREIGN PATENT DOCUMENTS

JP          08-285132          11/1996

\* cited by examiner

*Primary Examiner*—John K. Fristoe, Jr.
(74) *Attorney, Agent, or Firm*—Peter Ganjian

(57) ABSTRACT

A vacuum regulating valve has a poppet type valve element supported so as to be brought into uniformly close contact with a valve seat disposed in a passage connecting two main ports. The valve element is connected to a valve stem by a connecting mechanism that allows the valve element to tilt relative to the valve stem. A piston included in a cylinder actuator moves the valve stem axially.

3 Claims, 2 Drawing Sheets

VACUUM REGULATING VALVE

CROSS-REFERENCES TO RELATED APPLICATIONS

The present application is related to the Japanese Patent Application No. 2005-156121, filed May 27, 2005, the entire disclosure of which is expressly incorporated by reference herein.

BACKGROUND OF THE INVENTION (1) Field of the Invention

The present invention relates to a vacuum regulating valve for use in reducing the pressure of a vacuum chamber included in a physiochemical system, such as a semiconductor device fabricating system, for processing a workpiece by a chemical process.

(2) Description of the Related Art

A semiconductor substrate is subjected to a film forming process using process gasses in a vacuum chamber included in a semiconductor fabricating system to form a film on a surface of the semiconductor substrate. A vacuum regulating valve disclosed in, for example, JP-A-8-285132 is used to regulate a vacuum created in a vacuum chamber during an evacuating process for reducing pressure in the vacuum chamber prior to the film forming process and during the film forming process.

Generally, the vacuum regulating valve of this type is provided with two main ports respectively connected to the vacuum chamber and a vacuum pump. A valve seat is placed in a passage extending between the two main ports. A poppet type valve element is seated on the valve seat to close the vacuum valve and is lifted up from the valve seat to open the vacuum valve. A valve stem has one end connected to the valve element and the other end connected to a piston. The piston moves the valve stem to move the valve element for opening and closing the vacuum valve.

It is important for the vacuum regulating valve of this type to be able to intercept the flow of the process gas as perfectly as possible when the valve element is seated on the valve seat because the process gas is highly reactive and dangerous.

In some cases, the valve element is misaligned slightly with the valve stem owing to unsatisfactory machining accuracy in fabricating the components of the vacuum regulating valve and unsatisfactory assembling accuracy in assembling those components. If the valve element is thus slightly misaligned with the valve stem, the valve element comes into partial contact with the valve seat and the valve face of the valve element cannot be closely seated on the valve seat. If the valve element is thus improperly seated on the valve seat, the process gas is liable to leak.

BRIEF SUMMARY OF THE INVENTION

Accordingly, this invention is intended to provide a vacuum regulating valve including a valve element having a valve face capable of being uniformly seated on and of being tightly pressed by uniform pressure against a valve seat to close a passage and excellent in sealing performance.

One aspect of the present invention provides a vacuum regulating valve including: a main valve unit provided with a first main port, a second main port, a passage connecting the first and the second main port, and a poppet type valve element for opening and closing the passage; and a cylinder actuator provided with a piston for operating the valve element; wherein the main valve unit is provided with a valve chamber extending between the first and the second main port, a valve seat placed in a passage connected to the first main port, the valve element placed in the valve chamber to open and close the valve seat, a valve stem having a first end connected to the valve element by a connecting mechanism and a second end connected to the piston of the cylinder actuator, a spring seat put on the valve stem, and a return spring seated on the spring seat to push the valve element in a valve closing direction, and the connecting mechanism allows the valve element to tilt relative to the valve stem.

An optional aspect of the present invention provides the vacuum regulating valve, wherein the connecting mechanism includes a cylindrical connecting member attached to the valve element and provided with diametrically opposite radial through holes, a cylindrical end part formed in the first end of the valve stem, provided with a diametrical through hole aligned with the radial through holes of the cylindrical connecting member and capable of being fitted in the cylindrical connecting member, and a connecting pin inserted into the radial through holes of the cylindrical connecting member and the diametrical through hole of the cylindrical part of the valve stem, and clearances are formed between the cylindrical connecting member and the cylindrical end part and between the side surface of the diametrical through hole of the cylindrical end part and the connecting pin to permit the valve element to tilt relative to the valve stem.

Another optional aspect of the present invention provides the vacuum regulating valve, wherein a retaining ring is attached to a part near the connecting end part of the valve stem, the spring seat is provided with a center opening, the valve stem is passed through the center opening of the spring seat so that the spring seat can axially movable on the valve stem, and the spring seat is pressed against the retaining ring to hold the spring seat in place on the valve stem.

Another optional aspect of the present invention provides the vacuum regulating valve, wherein the spring seat serves also as a retaining member for preventing the connecting pin from falling off, the spring seat as pressed against the retaining ring overlaps the opposite ends of the connecting pin to restrict the axial movement of the connecting pin.

According to the aspect of the present invention, the valve element is connected to the valve stem so as to be tiltable relative to the valve stem. Therefore, the misalignment of the valve element with the valve stem can be corrected by the tilting movement of the valve element relative to the valve stem. Consequently, the valve element can be pressed by valve closing force against the valve seat so that the valve face of the valve element can be pressed closely against the valve seat when the vacuum regulating valve is closed and hence the gas will not leak from the vacuum regulating valve.

These and other features, aspects, and advantages of the invention will be apparent to those skilled in the art from the following detailed description of preferred non-limiting exemplary embodiments, taken together with the drawings and the claims that follow.

BRIEF DESCRIPTION OF THE DRAWINGS

It is to be understood that the drawings are to be used for the purposes of exemplary illustration only and not as a definition of the limits of the invention. Throughout the disclosure, the word "exemplary" is used exclusively to mean "serving as an example, instance, or illustration." Any embodiment described as "exemplary" is not necessarily to be construed as preferred or advantageous over other embodiments.

Referring to the drawings in which like reference character(s) present corresponding parts throughout.

DETAILED DESCRIPTION OF THE INVENTION

The detailed description set forth below in connection with the appended drawings is intended as a description of presently preferred embodiments of the invention and is not intended to represent the only forms in which the present invention may be constructed and or utilized.

Figure 1:
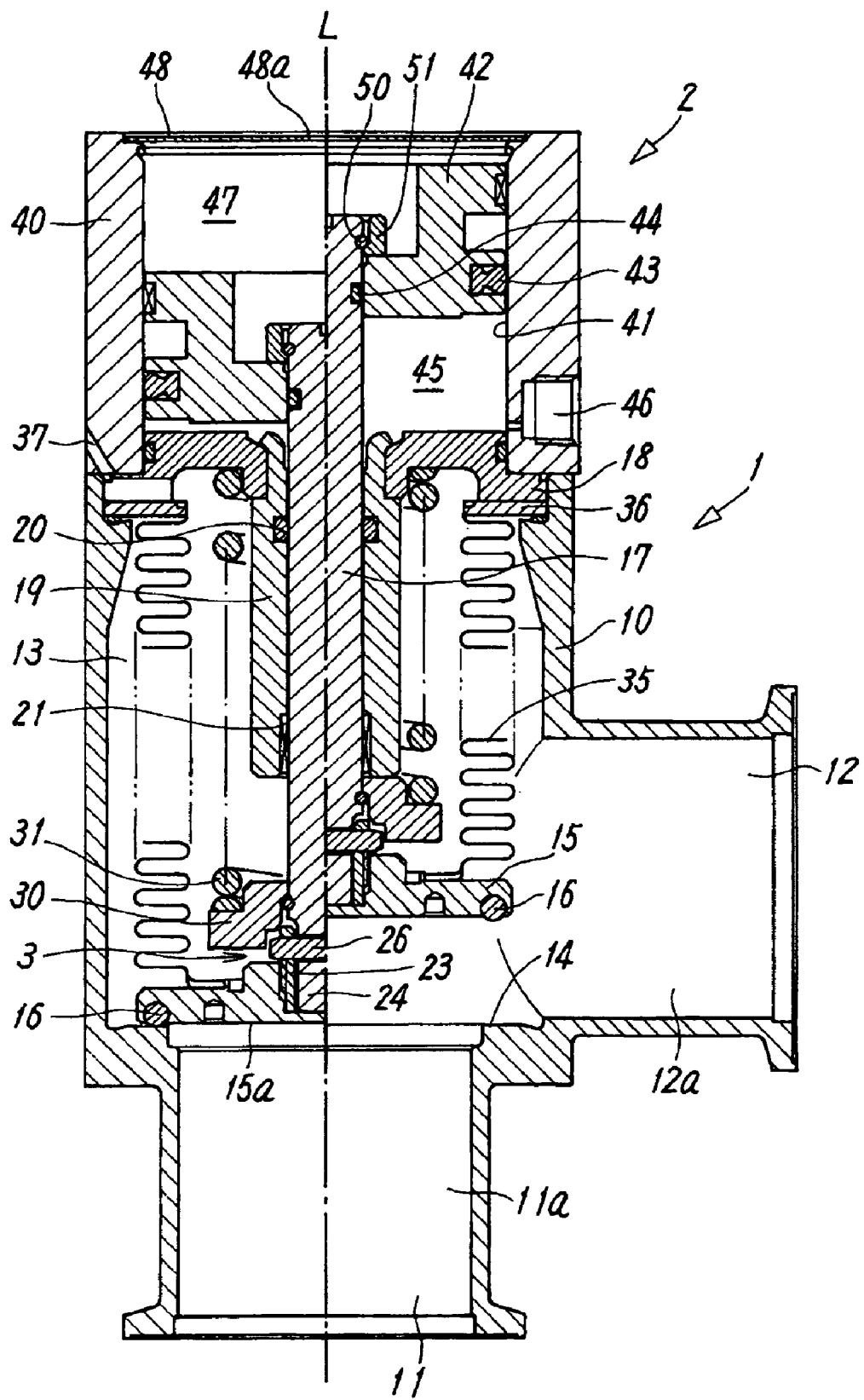
FIG. 1 is an exemplary illustration of a sectional view of a vacuum regulating valve in a preferred embodiment according to the present invention, in which the right half and the left half show the vacuum regulating valve in a fully open state and a fully closed state, respectively.
Figure 2:
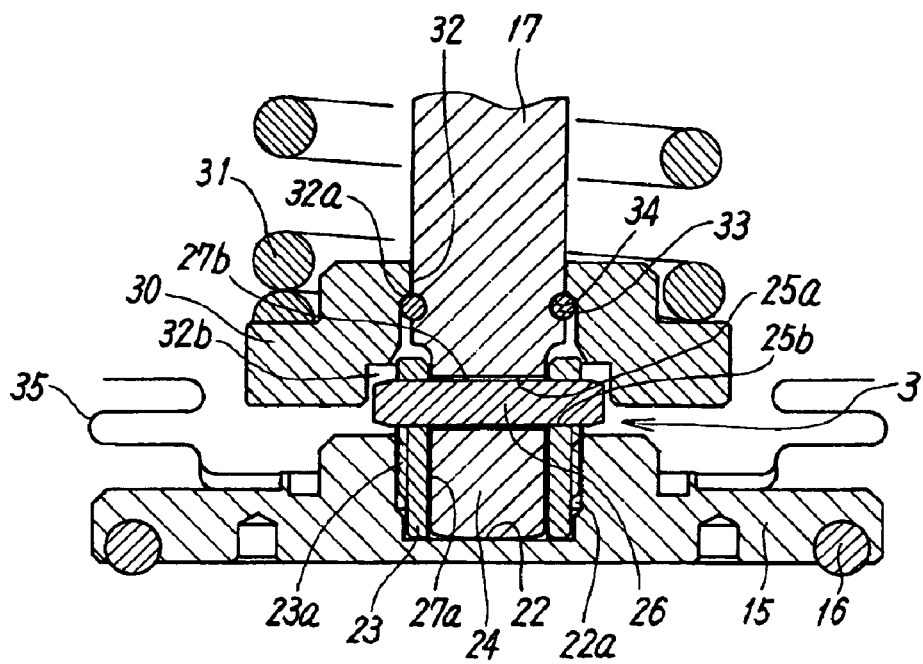
FIG. 2 is an exemplary illustration of an enlarged view of an essential part of the vacuum regulating valve shown in FIG. 1.
Figure 3:
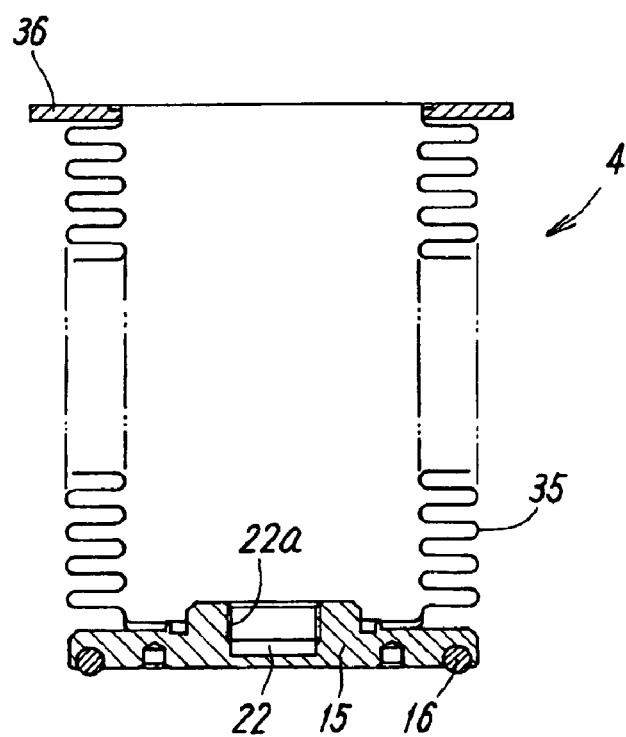
FIG. 3 is an exemplary illustration of a sectional view of a bellows assembly.

Referring to FIGS. 1 to 3 showing a vacuum regulating valve in a preferred embodiment according to the present invention, the vacuum regulating valve includes a main valve unit 1 provided with a passage, a valve seat 14 placed in the passage and a poppet type valve element 15 to be seated on and separated from the valve seat to open and close the vacuum regulating valve, and a cylinder actuator 2 for operating the valve element 15. The main valve unit 1 and the cylinder actuator 2 are joined together in alignment with the center axis L of the vacuum regulating valve.

The main valve unit 1 has a hollow valve body 10 of a shape substantially resembling a rectangular prism or a circular cylinder. The valve body 10 is made of a highly corrosion-resistant material, such as a stainless steel. The valve body 10 has a first main port 11 and a second main port 12 to be connected to a vacuum chamber and a vacuum pump, respectively. The first main port 11 has an axis aligned with the center axis L of the valve body 10. The second main port 12 has an axis perpendicular to the center axis L of the valve body 10. The valve seat 14 is disposed at the joint of the first passage 11a and the valve chamber 13.

Formed inside the valve body 10 are a first passage 11a leading to the first main port 11, a second passage 12a leading to the second main port 12 and a valve chamber 13 communicating with the first passage 11a and the second passage 12a. The valve seat 14 has an annular shape corresponding to the shape of the end of the first passage 11a opening into the valve chamber 13. The poppet type valve element 15 to be seated on and separated from the valve seat 14 to open and close the vacuum regulating valve is supported coaxially with the valve seat 14 in the valve chamber 13. The valve element 15 is provided in a peripheral part of its end surface 15a with an annular groove, and an annular sealing member 16 made of an elastic synthetic rubber is fitted in the annular groove of the valve element 15.

A lower end part of a cylindrical valve stem 17 is connected to a central part of the back surface of the valve element 15 by a connecting mechanism 3. The connecting mechanism 3 allows the valve element 15 to tilt relative to the valve stem 17. The valve stem 17 is extended through a guide tube 19 attached to a central part of a partition wall 18 separating the main valve unit 1 and the cylinder actuator 2 from each other with its axis aligned with the center axis L.

Thus the valve stem 17 is aligned with the center axis L and is guided for axial sliding movement by the guide tube 19. An upper end part of the valve stem 17 projects into a piston chamber 41 formed in the cylinder actuator 2 and is connected to a piston 42. A sealing ring 20 is fitted in an annular groove formed in the inner side surface of the guide tube 19 to seal the gap between the valve stem 17 and the guide tube 19. A wear ring 21 is fitted in a lower end part of the guide tube 19 to guide the valve stem 17 for axial sliding movement. The wear ring 21 serves also as a scraper.

A connecting mode in which the connecting mechanism 3 connects the valve element 15 and the valve stem 17 will be described. A round hole 22 provided with an internal thread 22a is formed in a central part of the back surface of the valve element 15. A cylindrical connecting member 23 has a base part provided with an external thread 23a. The connecting member 23 is removably screwed into the internally treaded round hole 22 with a part, provided with radial through holes 25b, of the base part thereof projecting from the back surface of the valve element 15. A lower end part of the valve stem 17 is reduced to form a cylindrical connecting part 24. A diametrical through hole 25a is formed in the connecting part 24. The connecting part 24 is fitted in the connecting member 23. A connecting pin 26 is inserted in the radial through holes 25b and the diametrical through hole 25a to connect the connecting member 23 and the connecting part 24 together.

The bore of the connecting member 23 is formed in an inside diameter smaller than the outside diameter of the connecting part 24 to provide a clearance 27a between the connecting member 23 and the connecting part 24. The diametrical through hole 25a of the connecting part 24 is formed in a diameter greater than the diameter of the connecting pin 26 to provide a clearance 27b between the connecting part 24 and the connecting pin 26. The clearances 27a and 27b allows the valve element 15 to tilt relative to the axis L of the valve stem 17.

The valve stem 17 and the connecting member 23 connected to the connecting part 24 of the valve stem 17 by the connecting pin 26 can be separated from the valve element 15 by turning the connecting member 23 relative to the valve element 15. The connecting member 23 can be separated from the connecting part 24 of the valve stem 17 by extracting the connecting pin 26 from the connecting member 23 and the connecting part 24 of the valve stem 17.

A spring seat 30 is put on the valve stem 17. A compression coil spring 31 is extended between the spring seat 30 and the partition wall 18. The compression coil spring 31 exerts a pressure through the spring seat 30 on the valve element 15 to press the valve element 15 continuously toward the valve seat 14.

The spring seat 30 has an annular shape and is provided with a center opening 32. The valve stem 17 is extended through the center opening 32 of the spring seat 30. The spring seat 30 is movable on the valve stem 17 along the axis L. A retaining ring 33 is attached to the valve stem 17. The retaining ring 33 engages with the edge 32a of the center opening 32 to retain the spring seat 30 in place on the valve stem 17. The retaining ring 33 is made of a hard material, such as a metal. The retaining ring 33 is fixedly fitted in an annular groove 34 formed in a part of the valve stem 17 near the connecting part 24. The retaining ring 33 can be removed from the valve stem 17 when necessary. The spring seat 30 can be easily removed from the valve stem 17 by removing the retaining spring 33 from the valve stem 17 and extracting the connecting pin 26 from the connecting member 23 and the connecting part 24 to separate the valve stem 17 from the connecting member 23.

The use of the retaining ring 33 for retaining the spring seat 30 on the valve stem 17 is simpler than combining the spring seat 30 with the valve stem 17 by screwing the valve seat 30 on the valve stem 17, facilitates assembling work and disassembling work for maintenance and avoids troubles attributable to the loosening of screws.

The spring seat 30 serves also as a retaining member for preventing the connecting pin 26 of the connecting mechanism 3 from falling off and as a stopper for determining a maximum opening of the vacuum regulating valve by limiting the movement of the valve element 15 away from the valve seat 14.

The center opening 32 of the spring seat 30 has an expanded part 32b. When the spring seat 30 is in contact with the retaining spring 33, the spring seat 30 overlaps at least parts of the opposite ends of the connecting pin 26 to restrict the axial movement of the connecting pin 26. Thus the spring seat 30 serves as a safety member.

When the valve stem 17 and the valve element 15 are lifted up to fully open the valve seat 14, the valve seat 30 is brought into contact with the lower end of the guide tube 19 to limit the upward movement of the valve stem 17 and the valve element 15. Thus the spring seat 30 serves also as a stopper.

An expandable bellows 35 is placed in the valve chamber 13 so as to surround the valve stem 17, the spring seat 30 and the compression coil spring 31. The bellows 35 is made of a corrosion-resistant material, such as a corrosion-resistant metal. The bellows 35 has one end joined to the back surface of the valve element 15 and the other end joined to a support ring 36 held between the valve body 10 and the partition wall 18. The bellows 35 extends and contracts according to the movement of the valve element 15. The interior of the bellows 35 is opened into the atmosphere through a breather 37 formed through the partition wall 18 and a cylinder 40 included in the cylinder actuator 2 to enable the bellows 35 to expand and contract.

As shown in FIG. 3, the bellows 35, the valve element 15 joined to one end of the bellows 35, and the support ring 36 attached to the other end of the bellows 35 constitute a bellows assembly 4. When the bellows 35 needs to be replaced with a new one due to the deposition of reaction products on the bellows 35 or the corrosion of the bellows 35, the bellows assembly 4 can be easily removed from the main valve unit 1 by removing the connecting member 23 from the valve element 15 and separating the support ring 36 from the valve body 10 and the partition wall 18.

The cylinder actuator 2 has the cylinder 40 coaxially joined to the valve body 10. The cylinder 40, similarly to the valve body 10 has a shape substantially resembling a rectangular prism or a circular cylinder. The cylinder 40 defines the piston chamber 41. The piston 42 provided with sealing members 43 is axially slidably fitted in the piston chamber 41. The valve stem 17 is connected to the piston 42. A sealing member 44 is attached to the valve stem 17 to seal the gap between the valve stem 17 and the piston 42.

A pressure chamber 45 is formed between the piston 42 and the partition wall 18. A pilot port 46 is formed in the side wall of the cylinder 40 so as to open into the pressure chamber 45. An open end of a space 47 on the back side of the piston 42 is closed by an end plate 48. The space 47 communicates with the atmosphere by means of an opening 48a formed in the end plate 48.

When the pilot port 46 is opened into the atmosphere to connect the pressure chamber 45 to the atmosphere, the valve element 15 is pressed toward the valve seat 14 by the resilience of the compression coil spring 31 to close the vacuum regulating valve by pressing the sealing member 16 against the valve seat 14 as shown in a left half of FIG. 1. Since the connecting mechanism 3 allows the valve element 15 to tilt relative to the valve stem 17 in this state, the valve element 15 can be pressed uniformly by pressure to bring the sealing member 16 entirely into close contact with the valve seat 14. Consequently, the vacuum regulating valve can be surely closed and hence the gas will not leak through the vacuum regulating valve.

When air is supplied through the pilot port 46 into the pressure chamber 45, the piston 42 moves upward to separate the sealing member 16 from the valve seat 14 by lifting up the valve stem 17 and the valve element 15 as shown in a right half of FIG. 1. The spring seat 30 comes into contact with the lower end of the guide tube 19 to limit the upward movement of the valve stem 17 and the valve element 15 to hold the valve element 15 at its fully open position.

The piston 42 is held on the valve stem 17 by a retaining ring 50 made of a hard material, such as a metal, and an annular stopping member 51. The annular stopping member 51 is axially slidably put on an end part the valve stem 17 extending on the back side of the piston 42. The retaining ring 50 is fixedly fitted in an annular groove formed in a part of the valve stem 17 near the free end of the valve stem 17. The back surface of the piston 42 comes into contact with the stopping member 51 stopped by the retaining ring 50 and thus the piston 42 is restrained from coming off the valve stem 17. The retaining ring 50 is removed from the valve stem 17 to remove the stopping member 51 and the piston 42 from the valve stem 17.

This attaching mechanism for attaching the piston 42 to the valve stem 17 is simpler in construction than an attaching mechanism using a fastening nut, facilitates assembling work and disassembling work for maintenance and avoids troubles attributable to the loosening of screws.

Although the invention has been described in considerable detail in language specific to structural features and or method acts, it is to be understood that the invention defined in the appended claims is not necessarily limited to the specific features or acts described. Rather, the specific features and acts are disclosed as preferred forms of implementing the claimed invention. Therefore, while exemplary illustrative embodiments of the invention have been described, numerous variations and alternative embodiments will occur to those skilled in the art. Such variations and alternate embodiments are contemplated, and can be made without departing from the spirit and scope of the invention.

What is claimed is:

1. A vacuum regulating valve, comprising:
   a first main port;
   a second main port;
   a passage connecting the first and the second main port;
   a cylinder actuator provided with a piston;
   a valve chamber extending between the first and the second main port;
   a valve seat placed in the passage;
   a valve element placed in the valve chamber for opening and closing the valve seat;
   a valve stem having a first end and a second end;
   the second end of the valve stem connected to the piston of the cylinder actuator;
   a spring seat placed on the valve stem;

a return spring placed on the spring seat to push the valve element in a valve closing direction;

a connecting mechanism connecting the first end of the valve stem and the valve element;

a cylindrical connecting member attached to the valve element, provided with diametrically opposite radial through holes;

a cylindrical end part formed in the first end of the valve stem, provided with a diametrical through hole aligned with the radial through holes of the cylindrical connecting member and being fitted in the cylindrical connecting member;

a connecting pin inserted into the radial through holes of the cylindrical connecting member and the diametrical through hole of the cylindrical end part of the valve stem; and clearances formed between the cylindrical connecting member and the cylindrical end part and between side surfaces of the diametrical through holes of the cylindrical end part and the connecting pin to permit the valve element to tilt relative to the valve stem.

2. The vacuum regulating valve according to claim 1, wherein a retaining ring is attached to a part near the connecting end part of the valve stem, the spring seat is provided with a center opening, the valve stem is passed through the center opening of the spring seat so that the spring seat can axially movable on the valve stem, and the spring seat is pressed against the retaining ring to hold the spring seat in place on the valve stem.

3. The vacuum regulating valve according to claim 1, wherein the spring seat serves also as a retaining member for preventing the connecting pin from falling off, the spring seat as pressed against the retaining ring overlaps the opposite ends of the connecting pin to restrict the axial movement of the connecting pin.

* * * * *